May 25, 1965

J. H. BLITZER, JR

3,185,833

LIGHT DIFFUSER APPARATUS

Filed Dec. 11, 1961

INVENTOR.
JACOB H. BLITZER, JR.
BY
Bernard Kriegel
ATTORNEY.

May 25, 1965  J. H. BLITZER, JR  3,185,833
LIGHT DIFFUSER APPARATUS
Filed Dec. 11, 1961  4 Sheets-Sheet 3

INVENTOR.
JACOB H. BLITZER, JR.
BY Bernard Kriegel
ATTORNEY.

May 25, 1965  J. H. BLITZER, JR  3,185,833
LIGHT DIFFUSER APPARATUS
Filed Dec. 11, 1961  4 Sheets-Sheet 4

INVENTOR.
JACOB H. BLITZER, JR.
BY
Bernard Kriegel
ATTORNEY.

United States Patent Office 3,185,833
Patented May 25, 1965

3,185,833
LIGHT DIFFUSER APPARATUS
Jacob H. Blitzer, Jr., Los Angeles, Calif., assignor to Integrated Ceilings & Grilleworks, Inc., Los Angeles, Calif., a corporation of California
Filed Dec. 11, 1961, Ser. No. 158,525
11 Claims. (Cl. 240—9)

The present invention relates to lighting systems, and more particularly to apparatus for diffusing light emanating from lighting fixtures, such as those supported from ceilings.

Diffusers have been used below fluorescent and similar lighting fixtures to distribute the illumination emanating from the light source. Where the diffusers cover a large area, as, for example, an entire ceiling, they are suitably supported on a frame structure carried by the latter. Heretofore, the supporting structure has been visible, mitigating against the appearance of the entire assembly. Moreover, it has been difficult to prevent light leaks between the diffuser devices and their supporting frame. Removal of the diffusers for the purpose of relamping, cleaning the apparatus, or the performance of other services, has been relatively inconvenient and time consuming.

Accordingly, it is an object of the present invention to provide a light diffuser apparatus, in which diffuser panel devices coact with their supporting structure in such manner as to hide the supporting structure, thereby enhancing the overall appearance of the apparatus.

Another object of the invention is to so relate the diffuser panel devices to their companion supporting structure and to one another that the joints between the diffuser devices are not readily discernable.

A further object of the invention is to prevent light leakage around diffuser panel devices and between such devices and their associated supporting structure.

An additional object of the invention is to provide a light diffuser apparatus in which the diffuser panel devices are easily installed and disassembled.

Yet another object of the invention is to provide a light diffuser apparatus from which the diffuser panel devices are easily partially placed in an open position or removed from their normal position with respect to their supporting structure, to facilitate changing of lamps, cleaning of the devices and the ceiling thereabove, and the performance of other desirable services.

Still a further object of the invention is to provide a light diffuser apparatus embodying a plurality of diffuser panel devices carried by a supporting structure, in which the diffuser panel devices are automatically aligned with respect to one another.

Another object of the invention is to provide a light diffuser apparatus, which is relatively easy and economical to manufacture and install.

A further object of the invention is to provide a light diffuser apparatus embodying diffuser panel devices which can be formed from flat sheet material.

Still another object of the invention is to provide a light diffuser apparatus embodying diffuser elements retained in their supporting panels in a simple and effective manner.

This invention possesses many other advantages, and has other objects which may be made more clearly apparent from a consideration of several forms in which it may be embodied. Such forms are shown in the drawings accompanying and forming part of the present specification. These forms will not be described in detail for the purpose of illustrating the general principles of the invention; but it is to be understood that such detailed description is not to be taken in a limiting sense, since the scope of the invention is best defined by the appended claims.

Referring to the drawings.

The apparatus illustrated in the drawings, by way of example, can be used to cover substantially an entire ceiling area, if desired, for the purpose of diffusing the light emanating from a plurality of fixtures mounted on the ceiling. For purposes of illustration, only a single lighting fixture 10, such as a fluorescent lighting fixture, adapted to contain a fluorescent tube or lamp 11, is disclosed, the lighting diffuser apparatus A being disposed therebelow in spaced relation to the fixture. Actually, a plurality of parallel rows of lighting fixtures 10 will normally be carried from the ceiling and the light diffuser apparatus A suspended from the ceiling in spaced relation to the fixtures, so as to fully cover the latter and diffuse the light emanating therefrom.

As illustrated, a supporting frame structure 12 is suspended from the ceiling (not shown). This frame structure includes longitudinally arranged horizontal members 13, which may extend substantially the entire length of the ceiling and in parallel relation to each other. Each longitudinal member 13 may be of an inverted T cross-section, comprising a T-bar having a vertical flange 14 and opposed horizontal flanges 15, 16 integral with the lower end of the latter. Interconnecting the longitudinal supporting members or T-bars 13 are cross supporting members, spreaders or separators 17, which may also be in the form of inverted T-bars. These cross T-bars are of proper length to separate the longitudinal bars 13 and maintain them in parallel spaced relation to one another. The cross T-bars are preferably of the same cross-sectional dimensions as the longitudinal T-bars 13, and include a vertical flange 18 and opposed horizontal flanges 19 integral with its lower end.

Figure 5:
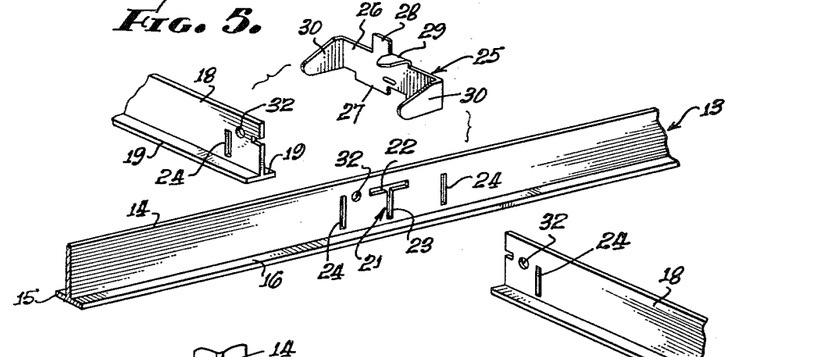
FIG. 5 is an exploded isometric projection of a portion of the supporting frame structure for the diffuser panel devices.
Figure 6:
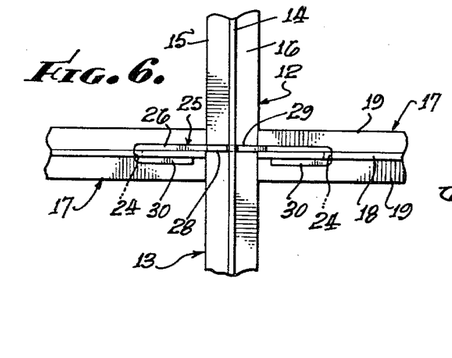
FIG. 6 is an enlarged top plan view taken generally along the line 6—6 on FIG. 1.

The cross members or spreaders 17 are secured to the longitudinal members 13 in appropriate spaced relation to form rectangular or square openings therewith, adapted to be covered by the diffuser devices 20. Adjacent to the ends of the cross members 17, the longitudinal members 13 are provided with T-shaped slots 21, including a horizontal slot portion 22 and a central vertical slot portion 23 depending therefrom. Each end portion of each cross member 17 is provided with a vertical slot 24 extending through its vertical flange 18. A connector clip 25 is employed to secure cross members 17 on opposite sides of a longitudinal member 13 to the latter. As shown, the connector clip includes a central plate portion 26 having a lower tab 27 depending therefrom and adapted to engage the upper surface of a horizontal flange 15 or 16 of one of the members 13. Spaced upper tabs 28, 29 extend from the central portion 26 of the clip, the spacing between them conforming to the thickness of the vertical flange 14 of a T-bar 13. At first, one of these upper tabs 29 is bent substantially at right angles to the main body portion 26 of the clip. Also extending from the ends of the main body 26 of the clip, and substantially at right angles thereto, are generally parallel arms or tabs 30, 30.

To secure the cross members 17 on opposite sides of a longitudinal member 13 to the latter, one of the arms or tabs 30 of the connector clip 25 is inserted through the vertical portion 23 of the T-slot 21, and, after passing therethrough, the connector clip is turned so that the main body portion 26 can pass through the vertical slot 23, the horizontal upper tab 29 then passing through the horizontal slot 22 until the vertical tabs 28, 27 engage the side of the vertical flange 14 of the longitudinal T-bar. The upper tab 29 is then bent upwardly to a vertical position, so that the tabs 28, 29 are then disposed on opposite sides of the vertical flange 14 of the longitudinal member above the horizontal slot 22, thereby preventing displacement of the connector clip 25, its main body portion 26 being disposed normal to the vertical flange 14 of the longitudinal supporting member 13, its end arms or tabs 30 being disposed substantially parallel to such vertical flange. The end portions of the cross members 17 are then disposed adjacent to the arms or tabs 30 and are slipped over them, the latter passing through the vertical slots 24 of the cross members and the main portion 26 of the connector clip engaging the same side of the cross member flanges 18. The arms or tabs 30 are then bent inwardly toward the main body 26 and flat against the opposed side of vertical flanges 18 of the cross members, to secure the latter to the longitudinal member 13, with the horizontal flanges 19 of the cross members abutting and in alignment with the horizontal flanges 15, 16 of the longitudinal supporting member 13.

All of the cross members 17 are connected to the longitudinal members 13 in the manner described until the supporting frame is completed, extending under the area of the ceiling from which the light is to be diffused that emanates from the fluorescent or similar light sources 10. The supporting frame 12 itself is suitably carried by the ceiling, as by passing wires (not shown), or the like, through holes 32 in the vertical flanges 14, 18 of the longitudinal and cross members 13, 17, suitably fastening such wires to the latter, the other ends of the wires being attached to the ceiling to position the inverted T-bar frame in appropriate spaced horizontal relation to the ceiling and the light fixtures 10. The T-bars 13, 17 constituting the longitudinal members and the cross members may actually be produced from the same material, as, for example, by providing T-bars with both the T-slots 21 and the vertical slots 24 therein in appropriate spaced relation to each other, so that the cross members may be formed by cutting the basic T-bar stock in the region of its T-slot 21, the vertical slots 24 for the cross members being positioned the appropriate distance from their ends.

Figure 11:
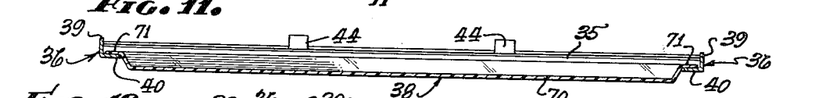
FIG. 11 is a section taken along the line 11—11 on FIG. 10.

The diffuser devices 20 are carried by the frame 12 and are adapted to cover its rectangular openings, as well as to hide the frame itself. The diffusers are so mounted on the frame as to be readily assembled thereto in a closed position across its openings and closely adjacent to one another, as well as to be swung to an open position, and even to be completely disconnected from the frame. As shown, each diffuser device 20 includes a diffuser support panel consisting of a rear member 35, side members 36 extending therefrom and a front member 37 secured to the side members. The rear, side and front may be integral with one another and define an opening therebetween adapted to be covered by a light diffusing panel structure 38. The opposed side members 36 of each diffuser support panel each includes a vertical flange 39 and a horizontal flange 40 integral therewith and extending inwardly from its lower end (FIG. 11). The rear member 35 of the diffuser support panel includes a stepped horizontal flange portion comprising an outer section 41 and an inner section 42 vertically displaced from the lower surface of the latter by approximately twice the thickness of the material from which the support panel is made. The outer section 41 merges into an upper panel retaining horizontal flange 43 spaced from the outer section 41 by a distance corresponding to the thickness of the material of a diffuser panel 38, for a purpose described hereinbelow. This retainer flange portion 43 merges into a vertical flange 44 extending upwardly therefrom to the same extent as the vertical flanges 39 of the sides 36 of the support panel. Integral with the rear vertical flange 44 and extending upwardly therefrom are spaced secondary support or safety tabs 45 which have outwardly extending horizontal portions 46 adapted to rest upon the horizontal flange 16 of a longitudinal frame member 13, as explained hereinbelow.

The front portion 37 of each diffuser support panel includes a lower horizontal flange 47 and an upper horizontal flange portion 48 disposed thereagainst and interconnected therewith by spaced end and intermediate U-shaped sections 49 that are integral therewith. The upper flange 48 is integral with a vertical flange 50 extending upwardly therefrom to the same vertical extent as the vertical flanges 39, 44 of the side and rear members 36, 35.

Figure 3:
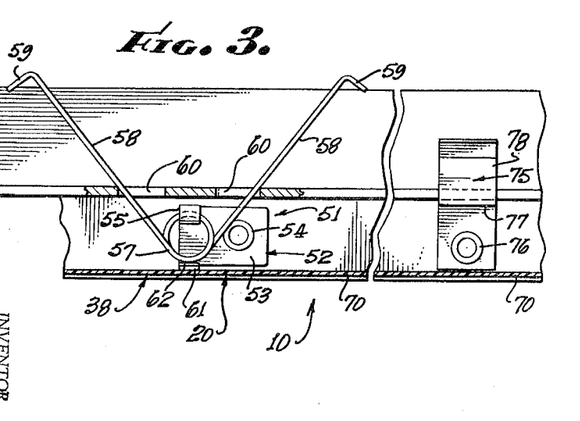
FIG. 3 is a section taken along the line 3—3 on FIG. 2, disclosing a support panel in its normal closed position with respect to its supporting structure.
Figure 4:
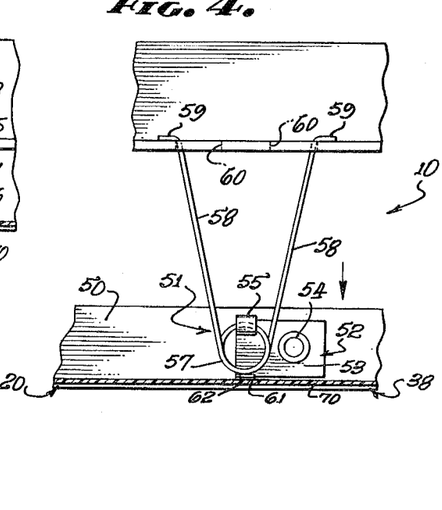
FIG. 4 is a view similar to FIG. 3 illustrating a support panel device lowered with respect to a supporting structure thereabove.
Figures 7, 8, 9:
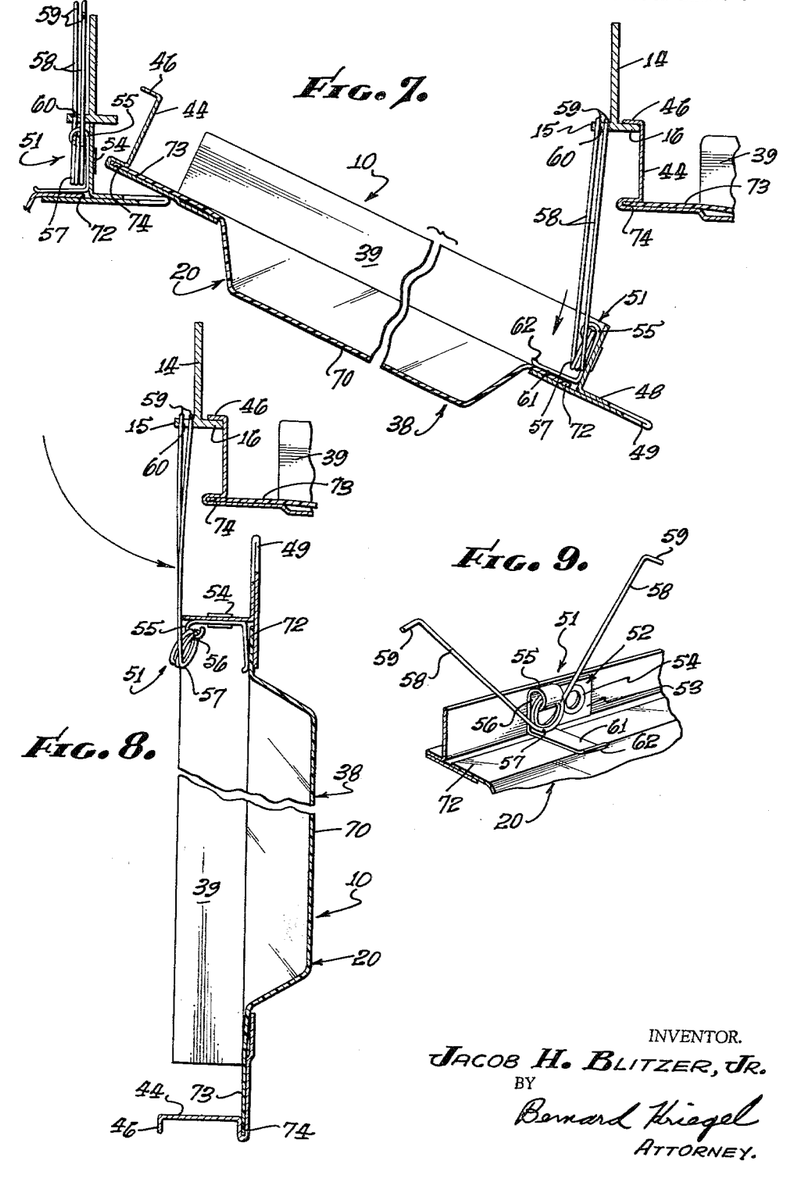
FIG. 7 is a view similar to FIG. 2 disclosing a support panel device in an initial step of shifting it to an open position with respect to its supporting frame structure.
FIG. 8 is a view similar to FIGS. 2 and 7 disclosing a support panel device in its fully opened or pendent position with respect to its frame structure.
FIG. 9 is a fragmentary isometric view of a hinge section of a diffuser device.
Figure 10:
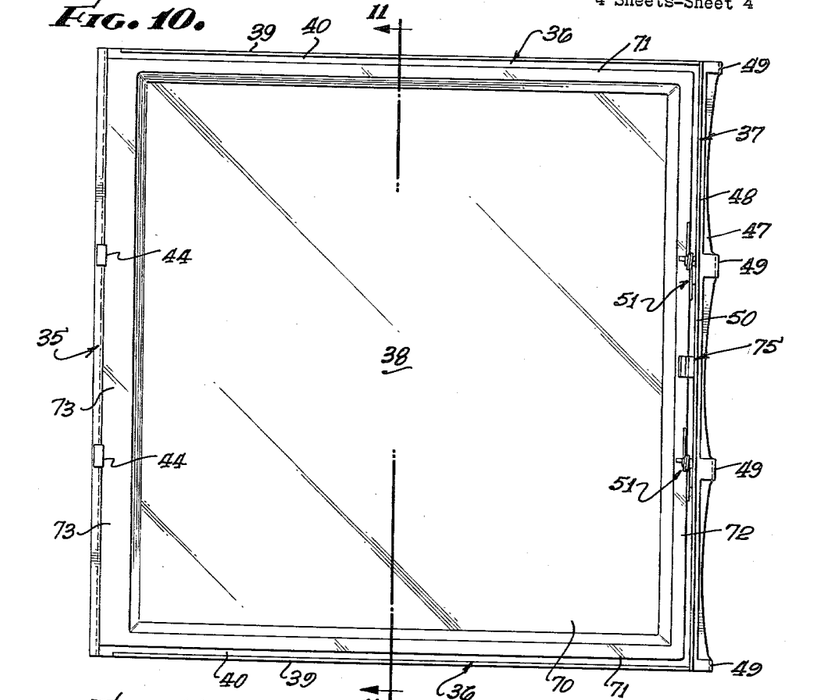
FIG. 10 is an enlarged top plan view of one of the diffuser devices.

The front member 37 of the diffuser support panel is releasably and hingedly secured to a horizontal flange 15 of a longitudinal frame member 13 by a plurality of spring-like hinge devices 51 secured in spaced relation to the vertical flange 50 of the front member. As shown, each hinge device 51 includes a spring retainer clip 52 having a vertical plate portion 53 attached to the vertical flange 50 in any suitable manner, as by means of a rivet 54. A loop 55 is integral with the upper portion of the plate 53 and extends inwardly therefrom, then curving in a downward and outward direction toward the plate member to form an opening 56 receiving the central coil portion 57 of a spring device 58, in order to pivotally assemble the spring device to the retainer clip. Extending from the coil portion 57 are upwardly diverging spring arm members 58 terminating in outwardly directed fingers 59. The intermediate coil portion 57 normally tends to cause the arms 58 to assume a diverging condition, such as disclosed in FIGS. 3 and 9 in the drawings. The outwardly directed fingers 59 are adapted to pass through adjacent elongated holes or apertures 60 in a vertical flange 15 of a longitudinal member 13. The apertures 60 are of sufficient length as to permit the fingers 59 to pass therethrough when a support panel is to be completely disassembled from the supporting frame structure 12. Extending inwardly from the lower portion of the vertical plate 53 of the spring retainer clip is a deflectable spring-like arm 61 spaced from the lower horizontal flange 47 of the front member of the support panel by a distance corresponding to the thickness of the material of a diffuser panel 38. The end 62 of the spring arm 61 will tend to bear against the diffuser panel and urge it downwardly against the lower horizontal flange 47, frictionally holding the diffuser panel against the latter.

Figure 1:
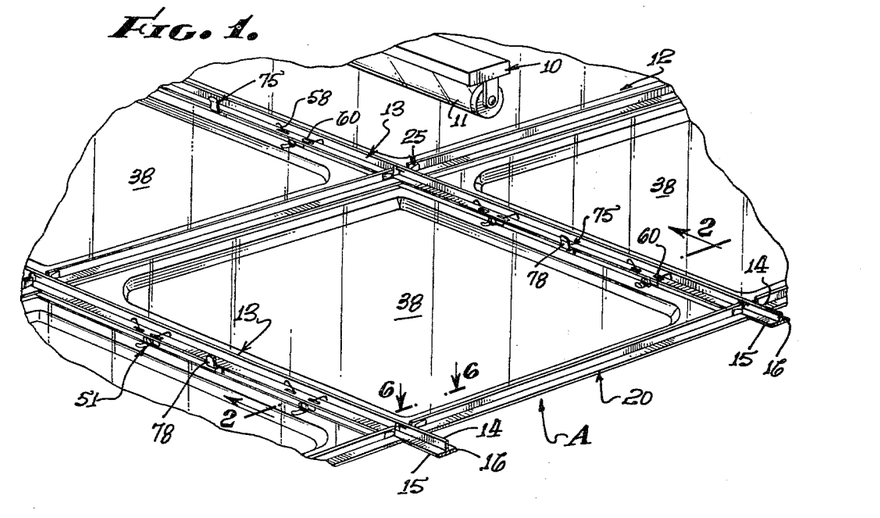
FIGURE 1 is an isometric view of apparatus embodying the invention in association with a light fixture thereabove.
Figure 2:
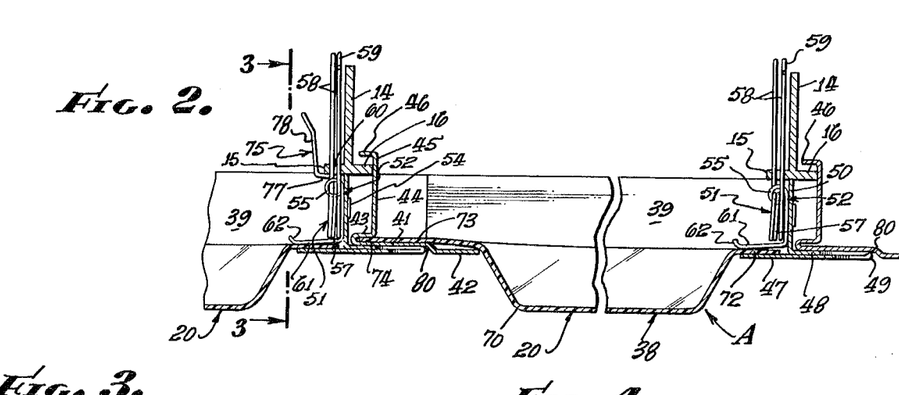
FIG. 2 is an enlarged section taken along the line 2—2 on FIG. 1.

The overall distance between the outer surfaces of the vertical flanges 39 of the sides 36 of a diffuser support panel is substantially the same as the center-to-center distance between the vertical flanges 18 of the cross members 17 of the frame structure 12. The overall distance from the outer surface of the vertical flange 44 of the rear support panel member 35 to the outer surface of the vertical flange 50 of the front member 37 is substantially equal to the distance between a horizontal flange 16 of a longitudinal member 13 and the center line of the vertical flange 14 of the next horizontal frame member 13. When the secondary support tabs 46 are disposed above the vertical flange 16, the arms 58 of the torsion spring are disposed in the plane of the elongate apertures 60, such as disclosed in FIG. 2.

The diffuser panel 38 may assume any suitable shape. As disclosed in FIGS. 1 to 11, inclusive, a single panel member is illustrated of generally dished, pan, or inverted dome configuration. The main central portion 70 of each diffuser panel extends downwardly through the opening of the diffuser support frame defined by the rear, sides and front portion 35, 36, 37. The side marginal flanges 71 of the support panel rest upon the inwardly directed horizontal flanges 40 of the sides 36 of the support. The front flange 72 is slipped under the spring-like clip elements 61 and rests upon the horizontal flange 47 of the front member; whereas the rear flange 73 of the diffuser element rests upon the horizontal flange 41, 42 of the rear member 35 and is disposed in the retainer groove 74 provided between the lower flange 41 and the upper flange 43, as shown most clearly in FIG. 2.

When the diffuser support panel 20 is carried by the frame 12, the rear tabs 45 engage the longitudinal member flange 16, there being a front limit clip 75 suitably secured, as by means of a rivet 76, to the vertical flange 50 of the front member, and having an intermediate horizontal portion 77 immediately under the horizontal flange 15 of a longitudinal member 13 which merges into an upwardly extending clip portion 78 extending across the outer edge of the horizontal flange 15. With the support panel 20 in place and in its uppermost position relative to the frame 12, the limit clip 75 prevents forward sliding of the panel member 20; whereas the secondary support tabs 45 prevent its rearward sliding.

In assembling the apparatus illustrated, the T-bar spreader or cross members 17 are secured to the longitudinal members 13 by the clips 25, all of these members being suitably supported from the ceiling, as by means of wires passing through the holes 32 in the vertical flanges, and suitably secured to the latter. The diffuser element 38 is mounted in each diffuser panel 20 by disposing its depending central portion 70 through the opening in the panel, the side flanges 71, 72, 73 of the element resting upon the corresponding side flanges of the panel, the rear flange 73 being slipped into the rear groove 74 and the front flange 72 then disposed under the spring clips 61 and upon the horizontal flange 47 of the front member 37. Each panel member is assembled in place by pressing the spring arms 58 toward each other sufficiently to allow passage of the outwardly extending fingers 59 upwardly through the elongate apertures 60 in the horizontal flange 15 of a longitudinal frame member 13. The person's fingers or other force holding these arms together, are then released, the arms 58 inherently swinging outwardly to the outer ends of the elongate holes or apertures 60, with the fingers 59 extending above the horizontal flange 15 and in a position to engage the latter and thereby support the front end of the diffuser panel, such as disclosed in FIGS. 4 and 8. With the front portion of the diffuser panel spaced or hanging downwardly away from the horizontal flange 15 of a longitudinal member, the limit clip 75 is disposed well below the longitudinal member. This allows the panel 20 to be swung in an upward direction, the spring members 51 supporting the front part of the panel and acting as a hinge, allowing the rear part 35 of the panel to be shifted upwardly towards the next adjacent longitudinal member 13 until the horizontal elements 46 of the secondary support tabs 45 are disposed above the horizontal flange 16 of the longitudinal member, the elements 46 then moving down and coming to rest upon the horizontal flange 16 to provide a rear panel support. The front part 37 of the panel is then shifted upwardly, the rear support tabs 46 functioning as a hinge by pivoting on the horizontal flange 16, the spring arms 58 moving through the elongate apertures 60 and inherently expanding outwardly to assume their diverging positions, until the front vertical flange 50 engages the underside of the horizontal flange 15, 16 of a longitudinal member 13. At this time, the limit clip 75 is disposed closely adjacent to and across the horizontal flange 15, prohibiting forward movement of the panel 20 and insuring that the secondary support tabs 46 will remain above the horizontal flange 16 of its associated longitudinal frame member 13. With the panel thus assembled, the front vertical member 50 is held against the underside of the horizontal flange 15, 16 of a longitudinal frame member 13 by the springs 51, the rear vertical flange 44 of the support panel being disposed a slight distance below the plane of the horizontal flange of its adjacent frame member 13, the side flanges 39 making an increasing gap from the front to the rear of the member 20 with respect to their associated spreaders or cross members 17.

The next panel devise 20 to the rear of the one previously installed on the frame structure 12 can then be assembled in the same manner, as by first passing the spring arms 58 through the apertures 60 and then swinging the rear portion 35 upwardly and placing its tabs 46 above an associated horizontal flange 16 of a longitudinal frame member 13, and by then pushing the front part 37 of the panel upwardly to a position in which the spring arms 58 inherently diverge to place the vertical front flange 50 up against the longitudinal frame member 16. As the springs 51 move the front member 37 upwardly toward a position of engagement with the longitudinal frame member 16, the outwardly directed U-shaped members 49 of the front member and the flanges 47, 48 are received in the stepped recess 80 of an adjacent rear panel member 35, and will shift the rear of this panel upwardly to move the vertical flanges 39 of the sides 36 of such panel member into snug engagement with their associated cross members 17. The next diffuser support panel 20 is then assembled in the same fashion to the rear of the second panel member 20, and this action is continued until an entire row of support panels has been installed on the frame structure 12. The spring hinge members 51 will shift the front of each support panel device snugly against a longitudinal support member 13, and in view of the overlapping relation of its flange members 47, 48 with the rear member 35 of an adjacent panel device will shift the rear of such panel device upwardly to place the side flange members 39 snugly against the frame cross members 17.

The next row of support panel devices can then be installed adjacent to the row just referred to, the vertical flanges 39 of the side members preferably being snugly adjacent to one another and in engagement with the cross members 17.

When the entire diffusing system has been installed, light will pass through the panel members 38, which may be of any suitable color, semi-transparent, or even fully transparent, if desired. Light from the light source 10 will only pass through the diffuser elements 38 and cannot leak between the panel devices 20 and the supporting frame 12. The sides 36 of the panel devices snugly engage the horizotnal flanges 19 of the cross members 17, and the vertical flanges 50 of the front members 37 snugly engage the horizontal flanges 15, 16 of the longitudinal members 13. The forwardly extending flange portions 47, 48 of the front members 37 engage the rear flange portion 35 of adjacent panel devices, precluding light leakage therebetween. Because of the close adjacency of the vertical side members 36 of the panel devices to one another, the overlapping relation of the front members 37 with respect to the rear members 35 of adjacent support panel devices, the frame structure 12 is not discernable from the floor, or from any other position normally occupied by a viewer. Thus, the support panel devices 20 coact with one another and with the support structure 12 thereabove to hide the latter, and thereby enhance the appearance of the entire system, also preventing light leakage around the front, rear, and sides of the panel devices 20. In addition, the joints between the supporting panel devices 20 are not readily discernable, the entire light diffusing system giving the appearance of a multiplicity of uniform diffusing sections in the nature of a sub-ceiling having a plurality of apertures formed therein and containing the light diffusing elements 38.

The panel devices 20 are readily assembled on the supporting frame 12. Each of them is readily shiftable to an open position, and, for that matter, can be completely disassembled from the supporting frame. In the event it is desired to open a panel 20, all that need be done is to pull its front portion 37 downwardly, the spring arms 58 engaging the outer ends of the elongate apertures 60 and moving toward one another until they assume the position illustrated in FIGS. 4 and 7, at which time, the front limit clip 75 is disposed well below the longitudinal frame member 13. The spring fingers 59 then serve to support the front part of the panel member in the inclined position illustrated in FIG. 7. The panel member 20 can then be shifted in a direction towards the front member 37 so as to slide the rear member 35 off the front flange 47, 48 and parts 49 of an adjacent panel supporting device; whereupon the panel can be allowed to swing downwardly to the generally vertical position illustrated in FIG. 8. A fluorescent light 11, or the like, can then be replaced, if desired, or other work performed, such as the cleaning of the diffuser device 38. After the necessary servicing operation has been accomplished, the panel is swung back towards the position illustrated in FIG. 7, as permitted by the spring hinges 51, which are supported from their associated longitudinal member 15 by the spring fingers 59, the rear member 35 then being slipped upwardly onto the forward flange portion of an adjacent panel supporting device; whereupon the front 37 of the panel member is pushed upwardly, the spring arms 58 diverging and bringing the vertical flange 50 of the front member again into a position of snug engagement with the lower surface of the longitudinal frame member 13, as well as locating its side flanges 39 against the lower surfaces of the cross members 17 and in close adjacency to panel devices 20 on opposite sides thereof. At this time, the secondary support tabs 46 at the rear of the reassembled panel supporting device will be disposed above its associated flange 16 of the longitudinal frame member 13.

If desired, a panel device 20 can be completely removed. After it has been swung downwardly to the position illustrated in FIG. 8, the spring arms 58 of each spring device at the front of the panel member can be shifted toward each other, allowing the fingers 59 to move downwardly through their apertures 60, which completely disconnects the panel device 20 from the supporting frame 12.

The panel devices 20 are readily assembled on the supporting frame 12 and with respect to each other, and are also partially or completely disassembled in the manner described above. Moreover, they are automatically placed in alignment with one another upon their assembly by virtue of the fact that the front portion 37 of each panel support device is urged upwardly against the rear portion 35 of an adjacent panel device, to bring the side flanges 39 of the adjacent panel device snugly against its associated cross members 17. The result of the assembly of all of the panel devices is that the side flanges 39 and front flanges 50 are all in flush engagement with the horizontal flanges 15, 16, 19 of the longitudinal frame members 13 and the cross frame members 17, each panel device being placed in a horizontal position. Moreover, the stepped contact 47, 48, 41 between the forward flange 47, 48 of one panel device and the rear flange 41 of the adjacent device places the lower outer surfaces of the flanges 47, 42 in a horizontal, substantially flush condition.

The diffuser panel devices 20 can be formed in an economical and comparatively easy manner from flat sheet material of the required gauge, which, for example, may be sheet steel or sheet aluminum. It is only necessary to provide suitable punching and forming equipment. Moreover, the diffuser elements 38 can also be formed readily of sheet material, being held in appropriate assembled relation on each panel support device in a simple manner, as by placing the rear flange 73 in the rear groove 74 and the front flange 72 under the spring clips 61 which press them firmly against the horizontal flange 47. The side flanges 71 of each diffuser panel rest snugly against the inwardly directed horizontal flanges 40 of the side members 36.

Figure 12:
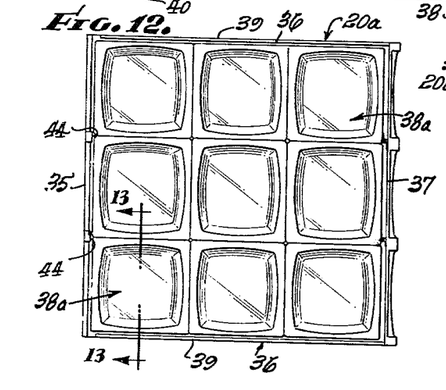
FIG. 12 is a top plan view similar to FIG. 10, but on a reduced scale, of a modified form of diffuser panel device.
Figure 13:
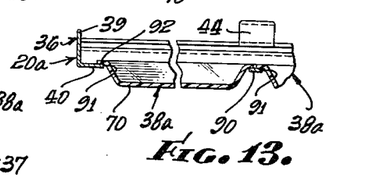
FIG. 13 is an enlarged section taken along the line 13—13 on FIG. 12.

In FIGS. 12 and 13, a different form of diffuser support panel 20a is illustrated. The outer frame of this panel is essentially the same as the other panel device. However, cross members 90 are provided at right angles to each other extending between the sides 36 of the frame and also between the front 37 and rear 35, providing a plurality of rectangular openings 91 through each of which a diffuser element 38a can extend. Each diffuser element is of dish shape, or in the form of an inverted dome, having a horizontal flange 92 running around its margin or perimeter and adapted to rest upon the crossing members 90, or the horizontal flanges 40, 47, 41 of the side, front and rear members 36, 37, 35 of the device. Thus, instead of providing a single diffuser element 38, as in the other form of the invention, a plurality of diffuser elements 38a are mounted in each support device 20a. These transparent or translucent diffuser elements 38a may be made from suitable sheet material and may possess various colors. In fact, a plurality of different colors may be mounted in a single support device, if desired. In all respects, however, the diffuser support device 20a with its plurality of diffuser elements 38a mounted therein is essentially the same as in the other form of invention. It is assembled on the frame 12 in the same manner and retained in operative position in the same manner. It can be completely or partially disassembled with respect to the frame 12 in the same manner as the other device 20.

I claim:

1. In light diffuser apparatus: a supporting frame adapted to be carried by and disposed below a ceiling structure, said frame having a plurality of openings; light diffusing devices covering said openings, the front of each device being in overlapping relation to the rear of an adjacent device, each of said devices having rear support means fixed thereto against movement with respect to said device and overlying and engageable with said frame to limit movement of the rear of said device downwardly from said frame, said rear support means of each device being movable with such device as a unit forwardly from overlying relation to said frame, each device also having front spring means engaging said frame to yieldably urge the front of said device upwardly against said frame and and upwardly against the rear of an adjacent device to urge said adjacent device upwardly toward said frame.

2. In light diffuser apparatus: a supporting frame adapted to be carried by and disposed below a ceiling structure, said frame comprising parallel spaced longitudinal members and parallel spaced cross members secured to said longitudinal members, said longitudinal and cross members defining rectangular openings therebetween; rectangular light diffusing devices covering said openings, the front of each device being in overlapping relation to the rear of an adjacent device and the sides of said devices being adjacent to each other, each of said devices having rear support means fixed thereto against movement with respect to said device and overlying and engageable with a first longitudinal member to limit movement of the rear of said device downwardly from said first longitudinal member, said rear support means of each device being movable with such device as a unit forwardly from overlying relation to said first longitudinal member, each device also having front spring means engageable with a second longitudinal member to yieldably urge the front of said device upwardly against said second longitudinal member and also upwardly against the rear of an adjacent device to urge the sides of said adjacent device upwardly against said cross members.

3. In light diffuser apparatus: a supporting frame adapted to be carried by and disposed below a ceiling structure, said frame comprising parallel spaced longitudinal members and parallel spaced cross members secured to said longitudinal members, said longitudinal and cross members defining rectangular openings therebetween; rectangular light diffusing devices covering said openings, the front of each device being in overlapping relation to the rear of an adjacent device and the sides of said devices being adjacent to each other, each of said devices having rear support means overlying and engageable with a first longitudinal member to limit movement of the rear of said device downwardly from said first longitudinal member, said rear support means of each device being movable with such device as a unit forwardly from overlying relation to said first longitudinal member, each device also having front spring means engageable with a second longitudinal member to yieldably urge the front of said device upwardly against said second longitudinal member and also upwardly against the rear of an adjacent device to urge the sides of said adjacent device upwardly against said cross members; and limit means on the front of each device engageable with said second longitudinal member to limit forward movement of said device with respect to said first and second longitudinal members to prevent forward movement of said rear support means from its position overlying said first longitudinal member thereby maintaining said rear support means in its position overlying said first longitudianl member and limiting downward movement of the rear of said device with respect to said first longitudinal member.

4. In light diffuser apparatus: a supporting frame adapted to be carried by and disposed below a ceiling structure, said frame having a plurality of openings; light diffusing devices covering said openings, the front of each device being in overlapping relation to the rear of an adjacent device, each of said devices having rear support means overlying and engageable with said frame to limit movement of the rear of said device downwardly from said frame, said rear support means of each device being movable with such device as a unit forwardly from overlying relation to said frame, each device also having front spring means engaging said frame to yieldably urge the front of said device upwardly against said frame and also upwardly against the rear of an adjacent device to urge said adjacent device upwardly toward said frame; and limit means on the front of each device engageable with said frame to limit forward movement of said device with respect to said frame to prevent forward movement of said rear support means from its position overlying said frame thereby maintaining said rear support means in a position overlying said frame and limiting downward movement of the rear of said device downwardly of said frame.

5. In light diffuser apparatus: a supporting frame adapted to be carried by and disposed below a ceiling structure, said frame having a plurality of openings; light diffusing devices covering said openings, the front of each device being in overlapping relation to the rear of an adjacent device, each of said devices having rear support means engageable with said frame to limit movement of the rear of said device downwardly from said frame, each device also having front spring means engaging said frame to yieldably urge the front of said device upwardly against said frame and also upwardly against the rear of an adjacent device to urge said adjacent device upwardly toward said frame; the rear of each device having an inner generally horizontal groove, and diffuser means mounted in said device and having a generally horizontal rear portion received in said groove.

6. In light diffuser apparatus: a supporting frame adapted to be carried by and disposed below a ceiling structure, said frame having a plurality of openings; light diffusing devices covering said openings, the front of each device being in overlapping relation to the rear of an adjacent device, each of said devices having rear support means engageable with said frame to limit movement of the rear of said device downwardly from said frame, each device also having front spring means engaging said frame to yieldably urge the front of said device upwardly against said frame and also upwardly against the rear of an adjacent device to urge said adjacent device upwardly toward said frame; the rear of each device having an inner generally horizontal groove; diffuser means mounted in said device and having a generally horizontal rear position received in said groove; and clip means on the front of each device yieldably engaging a generally horizontal front portion of said diffuser means to retain it against the front of each device.

7. In light diffuser apparatus: a supporting frame adapted to be carried by and disposed below a ceiling structure, said frame having a plurality of openings; light diffusing devices covering said openings, the front of each device being in overlapping relation to the rear of an adjacent device, each of said devices having rear support means overlying and engageable with said frame to limit movement of the rear of said device downwardly from said frame; said frame having apertures adjacent to the front of each device; said rear support means of each device being movable with such device as a unit forwardly from overlying relation to said frame, each device having spring means secured thereto and including inherently diverging arms extending through said apertures and engaging said frame to yieldably urge the front of said device upwardly against said frame and also upwardly against the rear of an adjacent device to urge said adjacent device upwardly toward said frame; and fingers secured to and extending outwardly of said arms and engageable with said frame to support the front of said device upon its lowering from said frame, said arms being movable toward each other to position said fingers for movement through said apertures.

8. In light diffuser apparatus: a supporting frame adapted to be carried by and disposed below a ceiling structure, said frame comprising parallel spaced longitudinal members and parallel spaced cross members secured to said longitudinal members, said longitudinal and cross members defining rectangular openings therebetween; rectangular light diffusing devices covering said openings, the front of each device being in overlapping relation to the rear of an adjacent device and the sides of said devices being adjacent to each other, each of said devices having rear support means overlying and engageable with a longitudinal member to limit movement of the rear of said device downwardly from said first longitudinal member; said rear support means of each device being movable with such device as a unit forwardly from overlying relation to said first longitudinal member, said longitudinal members having apertures adjacent to the front of each device; each device having spring means secured thereto and including inherently diverging arms extending through said apertures and engaging its associated longitudinal member to yieldably urge the front of said device upwardly against said associated longitudinal member and upwardly against the rear of an adjacent device to urge the sides of said adjacent device upwardly against said cross members; and fingers secured to and extending outwardly of said arms and engageable with said associated longitudinal member to support the front of said device upon its lowering from said associated longitudinal member, said arms being movable toward each other to position said fingers for movement through said apertures.

9. In light diffuser apparatus: a supporting frame adapted to be carried by and disposed below a ceiling structure, said frame comprising parallel spaced longitudinal members and parallel spaced cross members secured to said longitudinal members, said longitudinal and cross members defining rectangular openings therebetween; rectangular light diffusing devices covering said openings, the front of each device being in overlapping relation to the rear of an adjacent device and the sides of said devices being adjacent to each other, each of said devices having rear support means overlying and engageable with a longitudinal member to limit movement of the rear of said device downwardly from said longitudinal member; said rear support means of each device being movable with such device as a unit forwardly from overlying relation to said longitudinal member, said longitudinal members having apertures adjacent to the front of each device; each device having spring means secured thereto and including inherently diverging arms extending through said apertures and engaging its associated longitudinal member to yieldably urge the front of said device upwardly against said associated longitudinal member and upwardly against the rear of an adjacent device to urge the sides of said adjacent device upwardly against said cross members; fingers secured to and extending outwardly of said arms and engageable with said associated longitudinal member to support the front of said device upon its lowering from said associated longitudinal member, said arms being movable toward each other to position said fingers for movement through said apertures; limit means on the front of each device engageable with an associated longitudinal member to limit forward movement of said device with respect to said longitudinal members to maintain said rear support means in its position limiting downward movement of the rear of said device with respect to its adjacent longiudinal member, said arms having a sufficient length whereby lowering of said front member to bring said fingers into engament with an associated member places said limit means below its associated longitudinal member permitting forward movement of said device and disengagement of said rear support means from its adjacent longitudinal member, whereby said device can be swung downwardly to an open position with said fingers engaging its associated longitudinal member to support said device in a pendent position.

10. In light diffuser apparatus: a supporting frame adapted to be carried by and disposed below a ceiling structure, said frame comprising parallel spaced longitudinal members and parallel spaced cross members secured to said longitudinal members, said longitudinal and cross members defining rectangular openings therebetween; rectangular light diffusing devices covering said openings, the front of each device being in overlapping relation to the rear of an adjacent device and the sides of said devices being adjacent to each other, each of said devices having rear support means overlying and engageable with a longitudinal member to limit movement of the rear of said device downwardly from said longitudinal member; said rear support means of each device being movable with such device as a unit forwardly from overlying relation to said longitudinal member, said longitudinal members having apertures adjacent to the front of each device; each device having spring means secured thereto and including inherently diverging arms extending through said apertures and engaging its associated longitudinal member to yieldably urge the front of said device upwardly against said associated longitudinal member and upwardly against the rear of an adjacent device to urge the sides of said adjacent device upwardly against said cross members; fingers secured to and extending outwardly of said arms and engageable with said associated longitudinal member to support the front of said device upon its lowering from said associated longitudinal member, said arms being movable toward each other to position said fingers for movement through said apertures; limit means on the front of each device engageable with an associated longitudinal member to limit forward movement of said device with respect to said longitudinal members to maintain said rear support means in its position limiting downward movement of the rear of said device with respect to its adjacent longitudinal member, said arms having a sufficient length whereby lowering of said front member to bring said fingers into engagement with an associated longitudinal member places said limit means below its associated longitudinal member permitting forward movement of said device and disengagement of said rear support means from its adjacent longitudinal member, whereby said device can be swung downwardly to an open position with said fingers engaging its associated longitudinal member to support said device in a pendent position; the rear of each device having an inner generally horizontal groove, and diffuser means mounted in said device and having a generally horizontal rear portion received in said groove.

11. In light diffuser apparatus: a supporting frame adapted to be carried by and disposed below a ceiling structure, said frame comprising parallel spaced longitudinal members and parallel spaced cross members secured to said longitudinal members, said longitudinal and cross members defining rectangular openings therebetween; rectangular light diffusing devices covering said openings, the front of each device being in overlapping relation to the rear of an adjacent device and the sides of said devices being adjacent to each other, each of said devices having rear support means overlying and engageable with a longitudinal member to limit movement of the rear of said device downwardly from said longitudinal member; said rear support means of each device being movable with such device as a unit forwardly from overlying relation to said longitudinal member, said longitudinal members having apertures adjacent to the front of each device; each device having spring means secured thereto and including inherently diverging arms extending through said apertures and engaging its associated longitudinal member to yieldably urge the front of said device upwardly against said associated longitudinal member and upwardly against the rear of an adjacent device to urge the sides of said adjacent device upwardly against said cross members; fingers secured to and extending outwardly of said arms and engageable with said associated longitudinal member to support the front of said device upon its lowering from said associated longitudinal member, said arms being movable toward each other to position said fingers for movement through said apertures; limit means on the front of each device engageable with an associated longitudinal member to limit forward movement of said device with respect to said longitudinal members to maintain said rear support means in its position limiting downward movement of the rear of said device with respect to its adjacent longitudinal member, said arms having a sufficient length whereby lowering of said front member to bring said fingers into engagement with an associated longitudinal member places said limit means below its associated longitudinal member permitting forward movement of said device and disengagement of said rear support means from its adjacent longitudinal member, whereby said device can be swung downwardly to an open position with said fingers engaging its associated longitudinal member to support said device in a pendent position; the rear of each device having an inner generally horizontal groove; diffuser means mounted in said device and having a generally horizontal rear portion received in said groove; and clip means on the front of each device yieldably engaging a generally horizontal front portion of said diffuser means to retain it against the front of said device.

References Cited by the Examiner
UNITED STATES PATENTS

| | | | |
|---|---|---|---|
| 2,710,335 | 6/55 | Wong | 240—9 |
| 2,772,742 | 12/56 | Sprankle | 240—9 X |
| 2,792,245 | 5/57 | Dasher | 240—78 X |
| 2,829,243 | 4/58 | Stonehill | 240—78 |
| 2,833,199 | 5/58 | Wakefield | 240—9 X |
| 2,954,959 | 10/60 | Kaufman et al. | 240—78 X |
| 2,988,184 | 6/61 | Zinn | 189—85 |
| 3,035,165 | 5/62 | Trott | 240—146 X |

NORTON ANSHER, *Primary Examiner.*